United States Patent [19]

Nara et al.

[11] 3,873,692
[45] Mar. 25, 1975

[54] ANTIBIOTICS PLATOMYCIN A AND B AND PROCESS FOR PRODUCTION THEREOF

[75] Inventors: Takashi Nara, Tokyo; Seigo Takasawa, Kawasaki; Ryo Okachi, Tokyo; Isao Kawamoto, Tokyo; Seiji Sato, Tokyo; Mitsuyoshi Yamamoto, Tokyo; Tomoyasu Sato, Tokyo; Atsuko Morikawa, Tokyo, all of Japan

[73] Assignee: Kyowa Hakko Kogyo Co., Ltd., Tokyo, Japan

[22] Filed: Feb. 12, 1974

[21] Appl. No.: 441,838

[30] Foreign Application Priority Data
Feb. 22, 1973  Japan.................................. 48-20624

[52] U.S. Cl.................................. 424/116, 195/80
[51] Int. Cl............................................. A61k 21/00
[58] Field of Search...................... 424/116; 195/80

[56] References Cited
OTHER PUBLICATIONS

Miller, The Pfizer Handbook of Microbial Metabolites, McGraw–Hill Book Co., Inc., N.Y., N.Y., 1961, page 118.

*Primary Examiner*—Jerome D. Goldberg
*Attorney, Agent, or Firm*—Fitzpatrick, Cella, Harper & Scinto

[57] ABSTRACT

The antibiotics platomycin A and B are produced by fermentation of microorganisms belonging to the genus Streptosporangium. The antibiotics are accumulated in the culture liquor and are recovered therefrom.

6 Claims, 4 Drawing Figures

ANTIBIOTICS PLATOMYCIN A AND B AND PROCESS FOR PRODUCTION THEREOF

BACKGROUND

The present invention relates to new and novel antibiotics designated platomycin A and B, and a process for producing the same. More particularly, the present invention relates to the new antibiotics platomycin A and B and a process which comprises culturing a microorganism belonging to the genus Streptosporangium which is capable of producing platomycin A and/or B in a suitable medium to form and accumulate the antibiotics platomycin A and/or B, and recovering the antibiotics from the culture liquor.

The new antibiotics platomycin A and B are water-soluble basic antibiotics which have a very strong antibacterial activity against a broad range of Gram-positive and Gram-negative bacteria. The antibiotics also possess strong antibacterial activity against certain strains of *Staphylococcus aureus* and *Escherichia coli* which are resistant to various known antibiotics.

In view of the antibacterial activity of platomycin A and B, they may be utilized as antibiotics in the sanitation of surfaces etc.

DESCRIPTION OF THE INVENTION

In accordance with the present invention, the antibiotics platomycin A and B are produced by fermentation of microorganisms belonging to the genus Streptosporangium. A particularly suitable microorganism belongs to *Streptosporangium violaceochromogenes* subsp. *globophilum*, which has been newly established by the present inventors. Its typical strain is *Streptosporangium violaceochromogenes* subsp. *globophilum* MK-78 which has been isolated from field soil in Ito-shi, Shizuoka-ken, Japan. The two antibiotics produced by the MK-78 strain had initially been named XK-78-1 and XK-78-2, respectively. Thereafter, the two antibiotics were found to be novel and were renamed platomycin A and B, respectively. The Mk-78 strain has been deposited with the American Type Culture Collection, Rockville, Maryland and has been accorded accession No. 21893. The strain has the following microbiological properties.

I Morphology:

Substrate mycelium develops well, branches, is 0.4 – 0.8 $\mu$ in diameter and has a septum.

Aerial mycelium is septate and about 0.8 $\mu$ in diameter, and develops well straightly with simple branching. Almost no formation of loop form or spiral form of aerial mycelium is observed. Spherical sporangia are formed on sporangiophores of the aerial mycelium. The sporangia are about 5 – 10 $\mu$ in diameter. The sporangiophore is comparatively long (15 – 30 $\mu$ in length) and about 0.8 $\mu$ in diameter. There are no sporangia on the substrate mycelium.

Sporangiospores are arranged in a spiral form in each sporangium. They are oval or cylindrical, 0.8 – 0.9 $\mu$ × 1.2 – 1.6 $\mu$ in size, have a smooth surface and are without flagella and are non-motile.

II Cultural characteristics on various media:

Growth is generally good on natural media. The substrate mycelium is gold and the aerial mycelium is white to pinkish white. Soluble, deep reddish violet pigments are formed on some media. Growth is poor on synethetic media but a considerably large amount of aerial mycelium are produced.

Cultural characteristics on various nutrient media after culturing at 27°C for 2 weeks are shown in Table 1. The color indications are given according to the classifications of the Color Harmony Manual (Container Corporation of America)

Table 1

| Medium | Cultural characteristics on various media (G: growth; C: color) | | |
|---|---|---|---|
| | Substrate mycelium | Aerial mycelium | Soluble pigment |
| Czapek's agar | G: Poor<br>C: Colorless | G: Poor, powdery<br>C: White (a) | None |
| Glucose-asparagine | G: Poor<br>C: Colorless | G: Moderate, powdery<br>C: White (a) | None |
| Nutrient agar | G: Good<br>C: Yellow Maple (3ng) | G: Moderate<br>C: White (a)→ Sand(3cb) | C: Cherry Wine (7pe) |
| Egg albumin agar | G: Poor<br>C: Colorless | None | None |
| Starch agar | G: Poor<br>C: Colorless | G: Poor<br>C: White (a) | None |
| Yeast extract-malt extract | G: Moderate<br>C: Orange Rust (4pe) | G: Moderate<br>C: White (a) | None |
| Oatmeal agar | G: Poor<br>C: Peach Pink (5ea) | G: Poor or Moderate<br>C: White (a)→ Flesh Pink (6ca) | None |
| Glycerol-asparagine agar | G: Poor or Moderate<br>C: Pearl Shell Tint (2ba) | G: Poor<br>C: White (a) | None |
| Bennett's agar | G: Good<br>C: Gold (21c) | G: Good, Powdery<br>C: White (a) | None |

Table 1 —Continued

| Medium | Cultural characteristics on various media (G: growth; C: color) | | Soluble pigment |
| --- | --- | --- | --- |
| | Substrate mycelium | Aerial mycelium | |
| Emerson's agar | G: Good, granular<br>C: Amber (3pc) | G: Moderate<br>C: White (a)→ Flesh Pink (4ca) | None |
| Glucose-yeast extract agar | G: Good<br>C: Mustard Gold (2ne) | G: Good, powdery<br>C: White (a) | None |
| Hickey Tresner's agar | G: Moderate<br>C: Lt. Yellow (1 ½ ea) | G: Moderate, powdery<br>C: White (a)→ Pearl Shell Tint (3ba) | None |
| Tyrosine agar | G: Good<br>C: Amber (3pc) | G: Good<br>C: White (a) | C: Amber (3pe) |

III Utilization of carbon sources:
The utilization of carbon sources is shown in Table 2.

Table 2

| Carbon source | Utilization | Carbon source | Utilization |
| --- | --- | --- | --- |
| D-Arabinose | − | D-Mannitol | + |
| D-Galactose | + | D-Raffinose | − |
| D-Glucose | ++ | L-Rhamnose | − |
| Glycerol | − | Sucrose | + |
| D-Lactose | − | Starch | + |
| D-Levulose | + | D-Xylose | + |
| D-Inositol | − | | |

IV Physiological properties:
1. Growth conditions: Growth is good under aerobic conditions. The growth temperature is 25°C to 40°C with an optimum temperature of 30°C to 37°C. The strain grows at a pH range of 6.0 to 8.5 with an optimum pH of around 7.3.
2. Liquefaction of gelatin: No liquefaction is observed on gelatin medium - stab culture (at 27°C, for a month).
3. Action upon milk: No change is observed after culturing at 27°C for about a month.
4. Decomposition of cellulose: Negative
5. Hydrolysis of starch: Positive
6. Reduction of nitrate: Slightly positive
7. Formation of tyrosinase: Slightly positive
8. Chromogenic action: Negative The MK-78 strain forms spherical sporangia only on aerial mycelium on an agar medium. The sporangiospores do not possess flagella and are non-motile. Abundant sporangiospores are connected forming a spiral in a sporangium. From the aforementioned morphological characteristics, the MK-78 strain is regarded to be a sporangium-forming actinomycete and, particularly, a strain belonging to the genus Streptosporangium. With regard to classification, there have been reports of about 20 species belonging to the genus Streptosporangium. The MK-78 strain most closely resembles *Streptosporangium violaceochromogenes* MK-49 ATCC 21807 (FERM-P 1518) (TAKASHI NARA et al, U.S. Pat. Application Ser. No. 393,829) as in such characteristics as sporangia of 5 - 10 μ in diameter, oval or cylindrical sporangiospores, gold substrate mycelium, white to pinkish white aerial mycelium, production of deep reddish violet soluble pigments and the like. However, there are differences between these two strains as is illustrated in the following Table 3.

Table 3

Comparison between the MK-78 and MK-49 strains

| Strain<br>Difference | MK-78<br>ATCC 21893 | MK-49<br>ATCC 21807 |
| --- | --- | --- |
| State of colonies well grown on an agar medium | Form granular colonies irregular in size | Growth uniform on the medium, forming a flat surface on the medium. |
| Production of soluble pigments | Nutrient agar medium: Cherry Wine (7pe) | Nutrient agar medium, Bennett's agar medium and Emerson's agar medium: Raspberry (9nc) |
| Utilization of carbon sources: | | |
| Glycerol | Negative | Positive |
| D-Mannitol | Positive | Negative |
| Liquefaction of gelatin | Negative | Slightly positive |
| Action upon milk | Negative | Slightly positive |
| Tyrosinase | Slightly positive | Negative |

Although the MK-78 and MK-49 strains differ, such differences are not as significant as the differences between the MK-78 strain and the microorganisms of the other known species of the genus Streptosporangium. Accordingly, the MK-78 strain is regarded as a subspecies of *Streptosporangium violaceochromogenes* and, therefore, has been named *Streptosporangium violaceochromogenes* subsp. *globophilum* due to its tendency to form granular colonies on an agar medium and the like.

As in the case with other actinomycetes, this strain can undergo mutation by artificial means such as ultra-violet ray irradiation, $Co^{60}$ irradiation, X-ray irradiation and various mutation-inducing chemicals. Accordingly, any strain even if thus mutated, may be used in the present invention so far as it has the ability to produce platomycin A and/or B.

Generally, conventional methods for culturing actinomycetes may be employed in the process of the present invention. Various nutrient sources may be employed in the culturing medium. As a carbon source, glucose, starch, mannose, fructose, mannitol, sucrose, molasses, etc. may be used alone or in combination. Additionally, hydrocarbons, alcohols, organic acids, etc. may be used depending upon the ability of utilization possessed by the particular microorganism. Inorganic and organic nitrogen sources such as ammonium chloride, ammonium sulfate, urea, ammonium nitrate, sodium nitrate, etc., and natural nitrogen sources such as peptone, meat extract, yeast extract, dry yeast, corn steep liquor, soybean meal, casamino acid, soluble vegetable protein, etc., may be used alone or in combination. In addition, such inorganic salts as sodium chloride, potassium chloride, calcium carbonate and various phosphates may be added to the medium if necessary. Furthermore, organic or inorganic materials capable of promoting growth of the microorganism and the production of platomycin A and/or B may be properly incorporated in the medium.

A liquid culturing method, particularly a submerged stirring culturing method is most suitable for the process of the invention. A culturing temperature between 25° and 40°C is appropriate. It is desirable to carry out culturing at an approximately neutral pH.

The antibiotics of the invention are formed and accumulated in the culture liquor usually after 5 to 15 days of culturing. When the yield of the antibiotic in the culture liquor reaches a maximum, culturing is discontinued and the desired product is isolated and purified from the culture liquor after the microbial cells have been removed, for example by filtration.

Isolation and purification of the antibiotic from the filtrate is carried out according to the methods usually used in the isolation and purification of microbial metabolic products from a culture liquor.

Since platomycin A and B are basic and are readily soluble in water but hardly soluble in organic solvents other than methanol and ethanol, the desired product can be purified by the methods usually used for the purification of so-called water-soluble basic substances. More specifically, platomycin A and B may be purified by a proper combination of: adsorption and desorption from cation exchange resins and active carbon powders; column chromatography using cellulose, Sephadex (trade name) LH-20, Sephadex G-10, Sephadex G-25 and CM (carboxy-methyl)-Sephadex C-25; adsorption and desorption from an ion exchange resin of porous type; and other like methods.

For example, the culture filtrate is first adjusted to a pH of 6.5 and then subjected to adsorption on a cation exchange resin, Amberlite (trade name) IRC-50 (H$^+$ form). After washing with water, elution is carried out with 0.5N hydrochloric acid. The active fraction is then neutralized and subjected to adsorption on Amberlite IRC-50 (NH$_4^+$ form), and elution is carried out with 0.5N hydrochloric acid. After being neutralized, the active fraction is subjected to adsorption on Amberlite IRC-50 (H$^+$ form) and elution is carried out with 0.5N hydrochloric acid. The active fraction obtained is neutralized with Dowex (trade name) 44 (OH$^-$ form) and then concentrated to dryness. The resulting dry product is dissolved in 50% methanol and the solution is passed through a column of Sephadex LH-20. Development and elution is carried out with 50% methanol. Upon drying the active fraction, a crude powder of greyish green color is obtained. The thus obtained crude powder, i.e. a mixture containing platomycin A and B is dissolved in an aqueous solution of 0.1M ammonium formate. The resulting solution is subjected to adsorption on CM-Sephadex C-25 and elution is carried out by concentration gradient method with 0.1 – 1.0M ammonium formate. Platomycin A is eluted out in a fraction where the concentration of ammonium formate is about 0.3M. Platomycin B is eluated out in a fraction where the concentration of ammonium formate is about 0.4M. The fractions of platomycin A and B are subjected to adsorption on Amberlite CG-50 (H$^+$ form), respectively. Elution is then carried out with 0.5N hydrochloric acid. The active fractions are adjusted to a pH of 6.5 with Dowex 44 (OH$^-$ form) and concentrated to dryness. The dry products are dissolved in 50% methanol and the solutions are passed through columns of Sephadex LH-20. Development and elution is carried out with 50% methanol. The active fractions are concentrated, and after adding acetone to the concentrates, the hydrochlorides of platomycin A and B are obtained.

THE ANTIBIOTICS

The hydrochlorides of platomycin A and B are slightly bluish or greenish. They are readily soluble in water, soluble in methanol, slightly soluble in ethanol and almost insoluble in such organic solvents as acetone, butanol, ethyl acetate, butyl acetate, ether and benzene.

Figure 1:
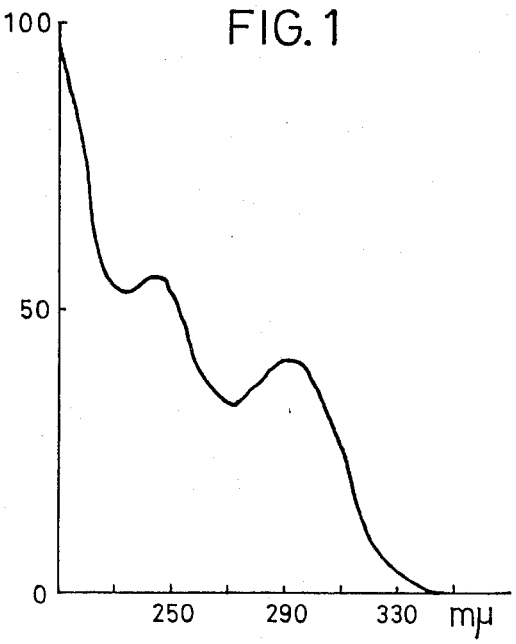
FIGS. 1 and 2 illustrate the ultraviolet absorption spectra of the hydrochlorides of platomycin A and B, respectively. Each of the spectra shows absorption maxima at 244 m$\mu$ and 293 m$\mu$.

3350, 3200 (Sh), 2950, 1710, 1655, 1635, 1550, 1510, 1455, 1375, 1325, 1245, 1160, 1120, 1090, 1045, 1010, 920

Both platomycin A and B give positive reaction in Sakaguchi, Pauli, Ehrlich and potassium permanganate tests, and negative reaction in ninhydrin, Elson-Morgan and ferric chloride tests.

The optical rotations of the antibiotics have not been determined due to the fact that aqueous solutions thereof absorb the D line of sodium. Moreover, the antibiotics of the invention, in a pure crystalline state have not been obtained. On the other hand, the hydrochloride of the antibiotics is readily obtainable in as nearly pure form as possible. According, the antibiotics will be described and classified hereinafter with reference to the hydrochlorides thereof. For example, the hydrochlorides of Platomycin A and B as obtained in the following Example 5 were subjected to elementary analysis which yielded the following values (%):

| | |
|---|---|
| Platomycin A: | C: 37.48, H: 5.57; N: 15.02, Cu: 3.90 |
| Platomycin B: | C: 37.46, H: 6.02, N: 15.65 Cu: 5.35 |

Platomycin A and B do not exhibit definite melting points or decomposition points. However, platomycin A decomposes gradually at a temperature above 220°C and platomycin B at a temperature above 200°C.

In solution, the platomycins (A and B) exhibit a greenish-bluish color. It is difficult to separate an active part in the molecular structure of the antibiotics from another part which tends to cause the greenish-bluish coloration. Accordingly it is considered that the antibiotics form a chelate compound with copper.

The Rf values of the hdyrochlorides of platomycin A and B obtained as a result of paper chromatography using various developers are shown in the following Table 4.

Table 4

Rf values of the hydrochlorides of platomycin A and B by ascending paper chromatography

| Developer | Rf value | |
|---|---|---|
| | Platomycin A | Platomycin B |
| 10% Ammonium chloride | 0.67 | 0.63 |
| 5% Ammonium chloride | 0.65 | 0.60 |
| Water-saturated n-butanol | 0.00 | 0.00 |
| n-Butanol-acetic acid-water (3:1:1) | 0.02 | 0.01 |
| Water-saturated n-butanol containing 2% p-toluenesulfonic acid and 2% piperidine | 0.02 | 0.01 |
| Water-saturated ethyl acetate | 0.00 | 0.00 |

Based on the above described properties, the antibiotics of the present invention are compared with the known antibiotics.

There has been known only XK-49-1-B-2 (TAKASHI NARA et al, U.S. Pat. application Ser. No. 393,829) as a water-soluble basic antibiotic produced by a microorganism of the genus Streptosporangium. It is apparent from the above that platomycin A and B are water soluble, basic antibiotics which have amide bonds, contain copper and show maximum absorptions at 244 m$\mu$ and 293 m$\mu$ in the ultraviolet spectra. Antibiotics having these characteristics are: Phleomycin (T. Ikekawa et al: J. Antibiotics, Ser. A17: 194, 1964), bleomycin (H. Umezawa et al: J. Antibiotics Ser. A19: 200, 1966; H. Umezawa et al: J. Antibiotics Ser. A19: 210, 1966; U.S. Pat. No. 3,681,491; Akio Fujii: Thesis for the doctorate awarded by Tokyo University, 1971), zorbamycin, zorbonomycin B, zorbonomycin C (A. D. Argoudelis et al: J. Antibiotics 24: 543, 1971), YA56-X and YA56-Y (Y. Ito et al: J. Antibiotics 24: 727, 1971) and the aforementioned XK-49-1-B-2.

The ratios of the absorbancy at 244 m$\mu$ to that at 293 m$\mu$ in the ultraviolet absorption in the cases of platomycin A and B are 1.31 and 1.33 respectively, whereas the absorbancy ratios for phleomycin, zorbamycin, zorbonomycin C, YA56-X and YA56-Y are 2.89, 2.91, 2.77, 2.78 and 2.85, respectively. In view of this, platomycin A and B are differentiated from these antibiotics. The absorbancy ratios for bleomycin, zorbonomycin B and XK-49-1-B-2 are 1.1 – 1.3 1.21 and 1.34 respectively. In this respect, platomycin A and B are similar to these antibiotics.

It is known that the antibiotic bleomycin includes several components designated as $A_1$, $A_2$, demethyl $A_2$, $A_{2-a}'$, $A_{2-b}'$, $A_3$, $A_4$, $A_5$, $A_6$, $B_1$, $B_1'$, $B_2$, $B_3$, $B_4$, $B_5$ and $B_6$. In the Sakaguchi test, platomycin A and B, bleomycin $B_1$, $B_2$, $B_3$, $B_4$, $B_5$ and $B_6$ show a positive reaction and all the A components and the $B_1'$ component show a negative reaction (Akio Fujii: Thesis for the doctorate awarded by Tokyo University, 1971). Additionally, platomycin A and B show a negative ninhydrin reaction, and bleomycin $A_{2-a}'$, $A_{2-b}'$, $A_4$, $A_5$ and $A_6$ show a positive reaction. Thus, platomycin A and B are distinguished from the antibiotics of the bleomycin A components and the $B_1'$ component.

Additionally, the Rf values of platomycin A and B are compared with those of bleomycin $A_2$, $A_5$, $B_2$ and $B_4$, zorbonomycin B and XK-49-1-B-2 by silica gel thin layer chromatography using various developers. The results are shown in the following Table 5.

Table 5

Rf values of the hydrochlorides of platomycin A and B and other antibiotics by silica gel thin layer chromatography

| Developer Substance | Rf Value | | | |
|---|---|---|---|---|
| | 1 | 2 | 3 | 4 |
| Platomycin A | 0.43 | 0.73 | 0.62 | 0.15 |
| Platomycin B | 0.10 | 0.60 | 0.47 | 0.05 |
| Bleomycin $A_2$ | 0.27 | 0.45 | 0.52 | 0.03 |
| do. $A_5$ | 0.05 | 0.60 | 0.28 | 0.05 |
| do. $B_2$ | 0.45 | 0.80 | 0.88 | 0.03 |
| do. $B_4$ | 0.10 | 0.75 | 0.68 | 0.03 |
| Zorbonomycin B | 0.33 | 0.76 | 0.84 | 0.19 |
| XK-49-1-B-2 | 0.26 | 0.78 | 0.40 | 0.45 |

Developer 1: Upper layer of chloroform-methanol- 17% aqueous ammonia (2:1:1 by volume)
2: 10% Ammonium acetate-methanol (1:1 by volume)
3: Methanol-10% ammonium acetate-10% aqueous ammonia (10:9:1 by volume)
4: 0.05M Citric acid buffer solution of pH 6.9

From the above Table 5, it is apparent that platomycin A and B are differentiated from bleomycin $B_2$ and $B_4$, zorbonomycin B and XK-49-1-B-2 in respect of Rf values by silica gel thin layer chromatography. It is also apparent from Table 5 that platomycin A and B show lower Rf values than that of bleomycin $B_4$ when the developer is 10% ammonium acetate and methanol (1:1). It is disclosed in Akio Fujii: Thesis for the doctorate awarded by Tokyo University, 1971 that the Rf values of bleomycin $B_1$ and $B_3$ by the silica gel thin layer chromatography with the same solvent system, i.e. 10% ammonium acetate and methanol (1:1), are higher than that of bleomycin $B_4$. Accordingly, platomycin A and B are differentiated also from bleomycin $B_1$ and $B_3$. Furthermore, it is known from the aforesaid Fujii Thesis and H. Umezawa et al: J. Antibiotics, Ser. A19: 210, 1960, that bleomycin $B_4$ and $B_6$ are eluted out from CM-Sephadex C-25 with ammonium formate solutions having concentrations of 0.67M and 0.9M or more, respectively, and bleomycin $B_5$ is eluted out from the same with ammonium formate solution having a concentration between 0.67M and 0.9M. As disclosed hereinabove, platomycin A is eluted with about 0.3M ammonium formate solution and platomycin B is eluted with about 0.4M ammonium formate solution. Accordingly, platomycin A and B are also considered different from bleomycin $B_5$ and $B_6$.

To further illustrate the novelty of platomycin A and B, 10 mg portions of platomycin A and B, phleomycin and bleomycin are hydrolized in 6N HCl at a temperature of 105°C for 20 hours. The hydrolyzates are concentrated to dryness to remove the HCl and the residues are then dissolved in 1 ml portions of water. These solutions are then subjected to paper chromatography using a mixture of n-butanol, acetic acid and water (4:1:2) as a developer. The acid hydrolysate of platomycin A and B showed the presence oif L-threonine and beta-carboxy-histidine. The acid hydrolysate of bleomycin, 2'-(2-aminoethyl)2,4'-bithiazole-4-carboxylic acid having a maximum UV absorption at 284~288 m$\mu$ appears at an Rf value of 0.46, while no compound having a maximum UV absorption of 284~288 mμ is detected at an Rf value of 0.46 in the case of platomycin A and B. Furthermore, the analysis of the acid hydrolysates using an amino acid analyzer reveals that β-alanine is present in the acid hydrolysates of phleomycin while this is not the case with the platomycins.

From the foregoing, platomycin A and B are found to be new antibiotics different from any of the above described antibiotics.

The antibacterial activity of platomycin A and B against various microorganisms is shown in the following Table 6.

Table 6

Antibacterial spectra of platomycin A and B by agar dilution method

| Microorganisms tested | Minimum inhibitory concentration (mcg/ml) | |
|---|---|---|
| | Platomycin A | Platomycin B |
| *Streptococcus faecalis* ATCC 10541 | >0.83 | >0.83 |
| *Staphylococcus aureus* ATCC 6538P | 0.014 | <0.001 |
| *Staphylococcus aureus* KY 8942 (resistant to Kanamycin, paromomycin and streptomycin) | 0.11 | 0.013 |
| *Staphylococcus aureus* KY 8950 (resistant to streptomycin, tetracycline, penicillin and sulfonamide) | 0.11 | 0.013 |
| *Staphylococcus aureus* KY 8953 (resistant to streptomycin, kanamycin, paromomycin, tetracycline, neomycin, kanendomycin and erythromycin) | >0.83 | >0.42 |
| *Staphylococcus aureus* KY 8956 (resistant to streptomycin, paromomycin, kanamycin, tetracycline, erthromycin and oleandomycin) | >0.83 | >0.42 |
| *Staphylococcus aureus* (resistant to chloramphenicol, streptomycin, kanendomycin, tetracycline, kanamycin and paromomycin) | >0.83 | >0.42 |
| *Bacillus subtilis* No. 10707 | 0.007 | <0.001 |
| *Bacillus cereus* ATCC 9634 | 0.027 | 0.026 |
| *Bacillus cereus* var. *mycoides* ATCC 9463 | <0.001 | <0.001 |
| *Klebsiella pneumoniae* ATCC 10031 | 0.027 | 0.014 |
| *Escherichia coli* ATCC 26 | 0.007 | 0.0035 |
| *Escherichia coli* KY 8310 (resistant to chloramphenicol, streptomycin, kanamycin, gentamicin, kanendomycin, paromomycin, tetracycline and spectinomycin) | 0.053 | 0.027 |
| *Escherichia coli* KY 8302 (resistant to chloramphenicol, streptomycin, kanamycin, paromomycin, tetracycline and spectinomycin) | 0.11 | 0.027 |
| *Escherichia coli* KY 8314 (resistant to streptomycin) | 0.053 | 0.027 |
| *Escherichia coli* KY 8315 (resistant to streptomycin, kanamycin, paromomycin and neomycin) | 0.014 | 0.027 |
| *Proteus vulgaris* ATCC 6897 | >0.83 | 0.21 |
| *Pseudomonas aeruginosa* BMH No. 1 | >0.83 | >0.83 |
| *Shigella sonnei* ATCC 9290 | 0.053 | 0.014 |

Table 6-Continued

Antibacterial spectra of platomycin A and B by agar dilution method

| Microorganisms tested | Minimum inhibitory concentration (mcg/ml) | |
|---|---|---|
| | Platomycin A | Platomycin B |
| *Salmonella typhosa* ATCC 9992 | 0.053 | 0.027 |

It is apparent from the foregoing that platomycin A and B have a very strong antibacterial activity against a broad range of Gram-positive and Gram-negative bacteria. Platomycin A and B also have a strong antibacterial activity against certain strains of *Staphylococcus aureus* and *Escherichia coli* which are resistant to various known antibiotics.

Practice of certain specific embodiments of the present invention is illustrated by the following representative examples.

EXAMPLE 1

*Streptosporangium violaceochromogenes* subsp. *globophilum* MK-78 (ATCC 21893) (FERM-P 1894) is used as a seed strain. One loopful of the seed strain is inoculated into 30 ml of a seed medium containing 2% glucose, 0.5% yeast extract, 0.5% peptone and 0.1% calcium carbonate (pH 7.2 before sterilization), in a 250 ml Erlermeyer flask and culturing is carried out at 30°C for 5 days with shaking. 30 ml of the seed culture broth is then inoculated into 300 ml of a second seed medium in a 2 l Erlenmeyer flask provided with baffles. The composition of the second seed medium is the same as that of the first seed medium. The second seed culturing is carried out at 30°C for 2 days, with shaking. Then, 1.5 l of the second seed culture broth (corresponding to the content of 5 flasks) is inoculated into 15 l of a third seed medium in a 30 l stainless steel jar fermenter. The composition of the third seed medium is the same as that of the first seed medium. Culturing in the jar fermenter is carried out at 30°C for 2 days with aeration and stirring (revolution: 350 r.p.m.; aeration 15 l/min). Then, 15 l of the third seed culture broth is inoculated into 100 l of a fourth seed medium in a 300 l fermenter. The composition of the fourth seed medium is the same as that of the first seed medium. Culturing in the fermenter is carried out at 30°C for 2 days with aeration and stirring (revolution: 150 r.p.m.; aeration: 100 l/min.). Finally, 100 l of the fourth seed culture broth is inoculated into 1000 l of a fermentation medium in a 2,000 l fermenter. The fermentation medium comprises 2% glucose, 0.1% yeast extract, 0.5% peptone and 0.1% calcium carbonate (pH 7.2 before sterilization). Culturing in the fermenter is carried out at 30°C for 12 days with aeration and stirring (revolution: 150 r.p.m.; aeration: 500 l/min.). After 12 days of culturing, both platomycin A and B are formed in the culture broth.

EXAMPLE 2

In this example, 100 l of the fourth seed culture broth obtained in the same manner as described in Example 1 is inoculated into 1000 l of a fermentation medium in a 2,000 l fermenter. The fermentation medium comprises 2% glucose, 3% corn steep liquor and 0.1% calcium carbonate (pH 7.2 before sterilization). Culturing in the fermenter is carried out at 30°C for 12 days with aeration and stirring (revolution 150 r.p.m.; aeration: 300 l/min.). After 12 days of culturing, both platomycin A and B are formed in the culture broth.

EXAMPLE 3

In this example, 1000 l of the fermentation broth obtained in Example 1 is adjusted to a pH of 3 with concentrated hydrochloric acid. About 40 kg of a filter aid, Radiolite No. 600 (manufactured by Showa Kagaku Kogyo Co., Ltd.) is added to the culture broth. Microbial cells and insoluble matter are removed by filtration. The filtrate is adjusted to a pH of 6.5 with concentrated aqueous ammonia and passed through a column of about 50 l of a cation exchange resin, Amberlite IRC-50 ($H^+$ form). Platomycin A and B are adsorbed on the resin. The resin is washed with water and elution is carried out with 0.5N hydrochloric acid. The active fraction is neutralized with Amberlite IR-4B ($OH^-$ form) and then passed through a column of 500 ml of Amberlite IRC-50 ($NH_4^+$ form). All the active substances are adsorbed on the resin. After washing the resin with water, impurities are eluted out with 0.3N aqueous ammonia. After the resin is washed again with water, elution is carried out with 0.5N hydrochloric acid. A fraction containing platomycin A and B is obtained. The thus obtained active fraction containing the platomycins is adjusted to a pH of 6.5 with sodium hydroxide and then passed through a column of 200 ml of Amberlite IRC-50 ($H^+$ form). The active substance is adsorbed on the resin. After washing the resin with water, elution is carried out with 0.5N hydrochloric acid. The active fraction is neutralized with Dowex 44 ($OH^-$) and then concentrated to dryness under reduced pressure. The concentrate is dissolved in a small amount of aqueous 50% methanol solution and passed through a column of Sephadex LH-20 pretreated with aqueous 50% methanol. Development and elution is carried out with aqueous 50% methanol. The active fraction eluted is concentrated under reduced pressure. Upon adding about 10 volumes of acetone to the concentrate, greyish green precipitates are obtained. In such manner 2 g of a dry powder is obtained. The activity of 1 mg of the powder corresponds to that of 300 mcg of platomycin A hydrochloride as best purified, which is obtained according to the process in the following Example 5. The activities of the resulting powders in the following examples are shown based on the activity of said platomycin A hydrochloride.

EXAMPLE 4

In this example, 950 l of the fermentation broth obtained in Example 2 is adjusted to a pH of 5.0 with concentrated hydrochloric acid. About 40 kg of a filter aid, Radiolite No. 600 is added to the fermentation broth and the mixture is subjected to filtration. The filtrate is passed through a column of 100 l of an ion exchange resin of porous type, HP 10. After washing the resin with water, an active substance is eluted out with 50% aqueous methanol. The active fraction is concentrated. After adding about 10 volumes of acetone to the concentrate, about 50 g of a dark brown powder is obtained. The activity of 1 mg of the powder corresponds to that of 50 mcg of the hydrochloride of platomycin A. The powder is dissolved in 200 ml of water and passed through a column of Amberlite IRC-50 ($NH_4^+$ form). Elution is carried out first with 0.3N aqueous ammonia followed successively by 0.5N hydrochloric acid as in Example 3. In this manner, a fraction containing platomycin A and B is obtained. The thus obtained fraction of platomycin A and B is subjected to purification using Amberlite IRC-50 ($H^+$ form) and Sephadex LH-20 in the same manner as described in Example 3. As a result, about 6 g of a greyish green powder is obtained. The activity of 1 mg of the powder corresponds to that of 300 mcg of the hydrochloride of platomycin A. The thus obtained crude powder is a mixture of platomycin A and B.

EXAMPLE 5

In this example, 5 g of the mixed crude powder of platomycin A and B obtained in Examples 3 and 4 is dissolved in 200 ml of an aqueous 0.1M ammonium formate solution, and then passed through a column of 50 ml of CM-Sephadex C-25. The active substance is adsorbed on the resin. After washing the resin with 500 ml of an aqueous 0.1M ammonium formate solution, concentration gradient elution is carried out with a total volume of 2 l of aqueous 0.1 to 1.0M ammonium formate solutions. Platomycin A is eluted out in a fraction where the concentration of the solvent is about 0.30M and platomycin B is eluted out in a fraction where the concentration of the solvent is about 0.4M. The active fractions of platomycin A and B thus obtained are passed through a column of 50 ml of Amberlite CG-50 ($H^+$ form), respectively. After washing the resin with water, elution is carried out with 0.5N hydrochloric acid. The active fraction is adjusted to a pH of 6.0 with Dowex 44 ($OH^-$ form) and concentrated to dryness. The concentrate is dissolved in a small amount of aqueous 50% methanol and passed through a column of Sephadex LH-20 pretreated with aqueous 50% methanol. Development and elution is carried out with aqueous 50% methanol. The active fraction eluted is concentrated, and then 10 volumes of acetone is added to the concentrate. Finally, about 300 mg of a light blue powder of the hydrochloride of platomycin A from the fraction of platomycin A, and about 150 mg of a light blue powder of the hydrochloride of platomycin B from the fraction of platomycin B are obtained.

Since the antibiotics of the present invention contain basic groups they can exist in the form of acid addition salts. Accordingly, the present invention contemplates the pharmaceutically nontoxic acid addition salts of the antibiotics (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

Figure 3:
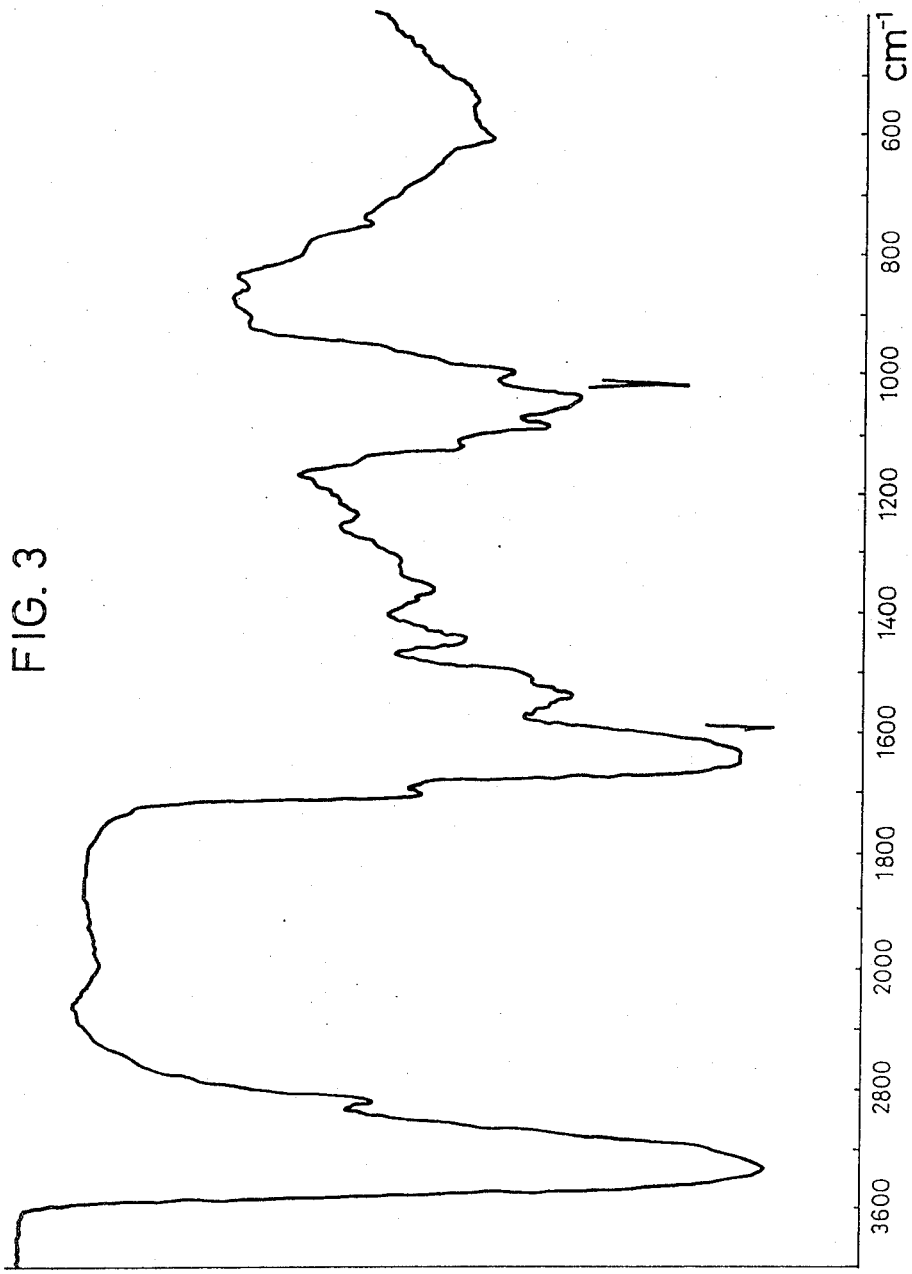
FIGS. 3 and 4 illustrate the infrared absorption spectra of the hydrochlorides of platomycin A and B in KBr tablets, respectively. As is apparent from these two figures, the spectra therein are common in having the absorption peaks at the following wavelengths (cm$^{-1}$)

What is claimed is:

1. The antibiotic, platomycin A, the hydrochloride of which is characterized by:
   a. Elementary analysis:
      C: 37.48%, N: 15.02%
      H: 5.57%, Cu: 3.90%;
   b. Ultraviolet absorption spectrum (water) essentially as shown in FIG. 1;
   c. Infrared absorption spectrum essentially as shown in FIG. 3;
   d. A ratio of 1.31 of absorbance at at 244 m$\mu$ to that at 293 m$\mu$ in ultraviolet absorption (water);
   e. Color reaction — positive Sakaguchi, Pauli, Ehrlich and potassium permanganate tests; negative ninhydrin, Elson-Morgan and ferric chloride tests;

f. Paper chromotography Rf values as shown in Table 4; and g. Silaca gel thin layer chromatography Rf values as shown in Table 5.

2. A pharmaceutically acceptable acid addition salt of platomycin A defined in claim 1, said acid addition salt being selected from the group consisting of hydrochloride, hydrobromide, hydroiodlide, sulfate, sulfamate, phosphate, maleate, acetate, citrate, oxalate, succinate, benzoate, tartrate, fumarate, malate, mandelate and ascorbate.

Figure 2:
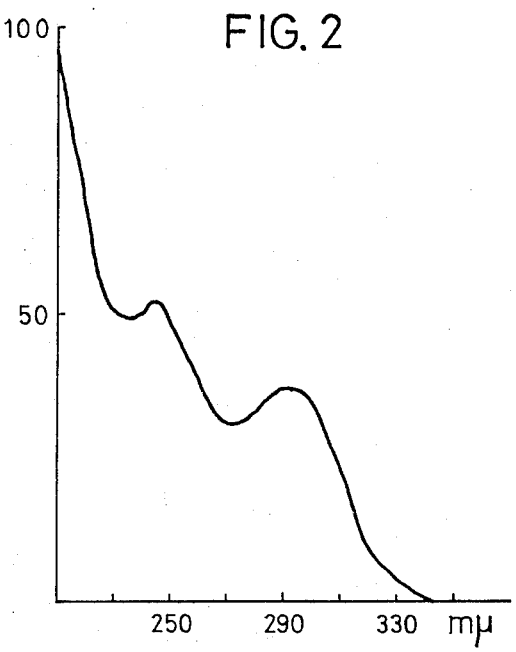
Figure 4:
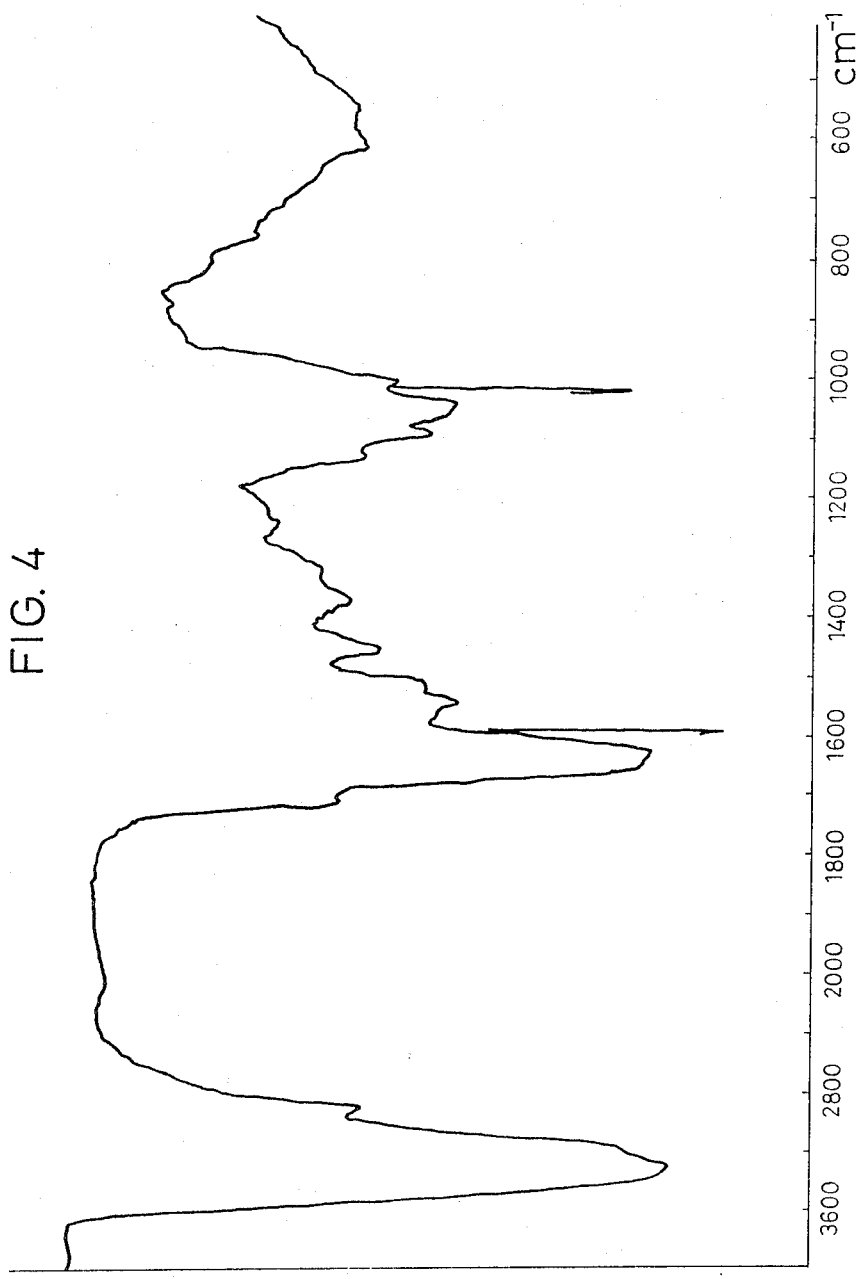

3. The antibiotic platomycin B, the hydrochloride of which is characterized by:

a. Elementary analysis:
C: 37.46%, N: 15.65%,
H: 6.02%, Cu: 5.35%;

b. Ultraviolet absorption spectrum (water) essentially as shown in FIG. 2;

c. Infrared absorption spectrum essentially as shown in FIG. 4;

d. A ratio of 1.33 of absorbance at 244 $\mu$ to that of 293 $\mu$ in ultraviolet absorption (water);

e. Color reaction — positive Sakaguchi, Pauli, Ehrlich and potassium permanganate tests; negative ninhydrin, Elson-Morgan and ferric chloride tests;

f. Paper chromatography Rf Values as shown in Table 4; and g. Silaca gel thin layer chromotography Rf values as shown in Table 5.

4. A pharmaceutically acceptable acid addition salt of phatomycin B defined in claim 3, said acid addition salt being selected from the group consisting of hydrochloride, hydrobromide, hydroiodlide, sulfate, sulfamate, phosphate, maleate, acetate, citrate, oxalate, succinate, benzoate, tartrate, fumarate, malate, mandelate and ascorbate.

5. A process for the production of the antibiotic platomycin A which comprises aerobically culturing *Streptosporangium violaceochromogenes* subsp. *globophilum* ATCC 21893 in a culture medium containing assimilable sources of carbon and nitrogen at about neutral pH and at a temperature of from 25° to 40°C until substantial antibacterial activity is detected in the culture medium; and thereafter isolating platomycin A from said culture medium.

6. A process for the production of the antibiotic platomycin B which comprises aerobically culturing *Streptosporangium violaceochromogenes* subsp. *globophilum* ATCC 21893 in a culture medium containing assimilable sources of carbon and nitrogen at about neutral pH and at a temperature of from 25° to 40°C until substantial antibacterial activity is detected in the culture medium; and thereafter isolating platomycin B from said culture medium.

* * * * *